United States Patent
Lee

(10) Patent No.: US 6,913,366 B2
(45) Date of Patent: Jul. 5, 2005

(54) ILLUMINATING DEVICE AND DISPLAY APPARATUS USING THE SAME

(75) Inventor: Kyoung-Don Lee, Seoul (KR)

(73) Assignee: Samsung Electronics Co., Ltd. (KR)

( * ) Notice: Subject to any disclaimer, the term of this patent is extended or adjusted under 35 U.S.C. 154(b) by 52 days.

(21) Appl. No.: 10/283,510

(22) Filed: Oct. 29, 2002

(65) Prior Publication Data

US 2003/0147257 A1 Aug. 7, 2003

(30) Foreign Application Priority Data

Feb. 5, 2002 (KR) .......................................... 2002-6528

(51) Int. Cl.$^7$ .................. F21V 8/00; G02F 1/1335; G02B 6/42
(52) U.S. Cl. .................. 362/31; 362/27; 362/555; 362/561; 349/65; 385/901
(58) Field of Search .................. 349/62, 65; 362/27, 362/31, 555, 561; 385/129, 901

(56) References Cited

U.S. PATENT DOCUMENTS

| | | | | |
|---|---|---|---|---|
| 5,130,898 A | * | 7/1992 | Akahane | 362/31 |
| 5,528,709 A | * | 6/1996 | Koike et al. | 362/31 |
| 5,724,108 A | * | 3/1998 | Shibata | 349/62 |
| 5,949,505 A | * | 9/1999 | Funamoto et al. | 349/65 |
| 6,301,026 B1 | * | 10/2001 | Ueda | 362/31 |
| 6,582,095 B1 | * | 6/2003 | Toyoda | 362/31 |
| 6,669,350 B2 | * | 12/2003 | Yamashita et al. | 362/31 |

* cited by examiner

Primary Examiner—Alan Cariaso
(74) Attorney, Agent, or Firm—Cantor Colburn LLP

(57) ABSTRACT

An illuminating device in which one or more chamfer surfaces are formed at one or more corner portions, respectively, of a light guiding part, and a luminous body is disposed corresponding to a chamfer surface, and a display apparatus using the illuminating device are disclosed. The illuminating device has the light guiding part for guiding light to a display unit of the display apparatus and a light source part. The light guiding part includes an incident surface on which the light is incident, a back surface opposite to the incident surface, an emitting surface from which the light is emitted to the display unit, side surfaces perpendicular to the incident surface and the emitting surface, and chamfer surfaces formed at corner portions, respectively, each connected to the incident surface and one of the side surfaces. The light source part includes marginal luminous bodies each corresponding to each of the chamfer surfaces. The light source part may further have at least one central luminous body that corresponds to the incident surface.

24 Claims, 12 Drawing Sheets

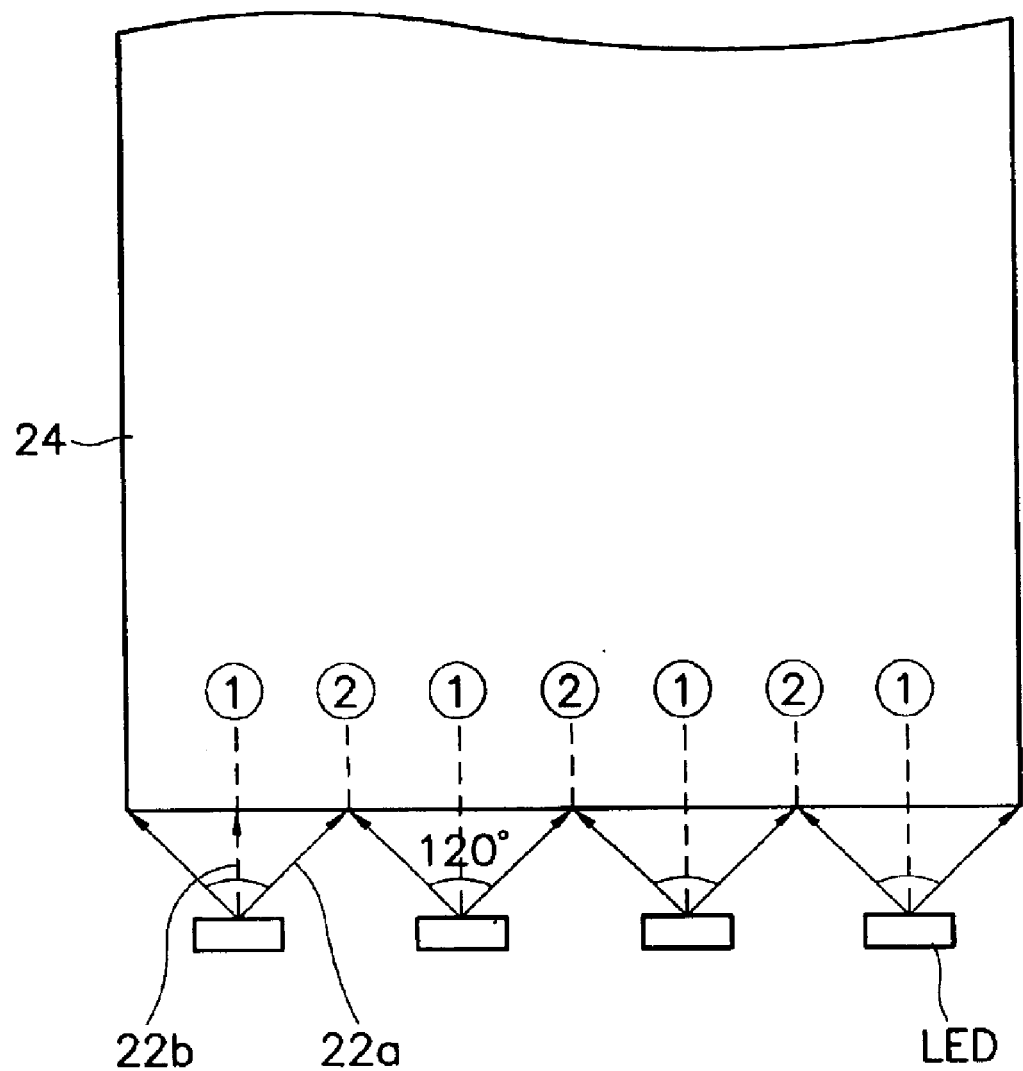

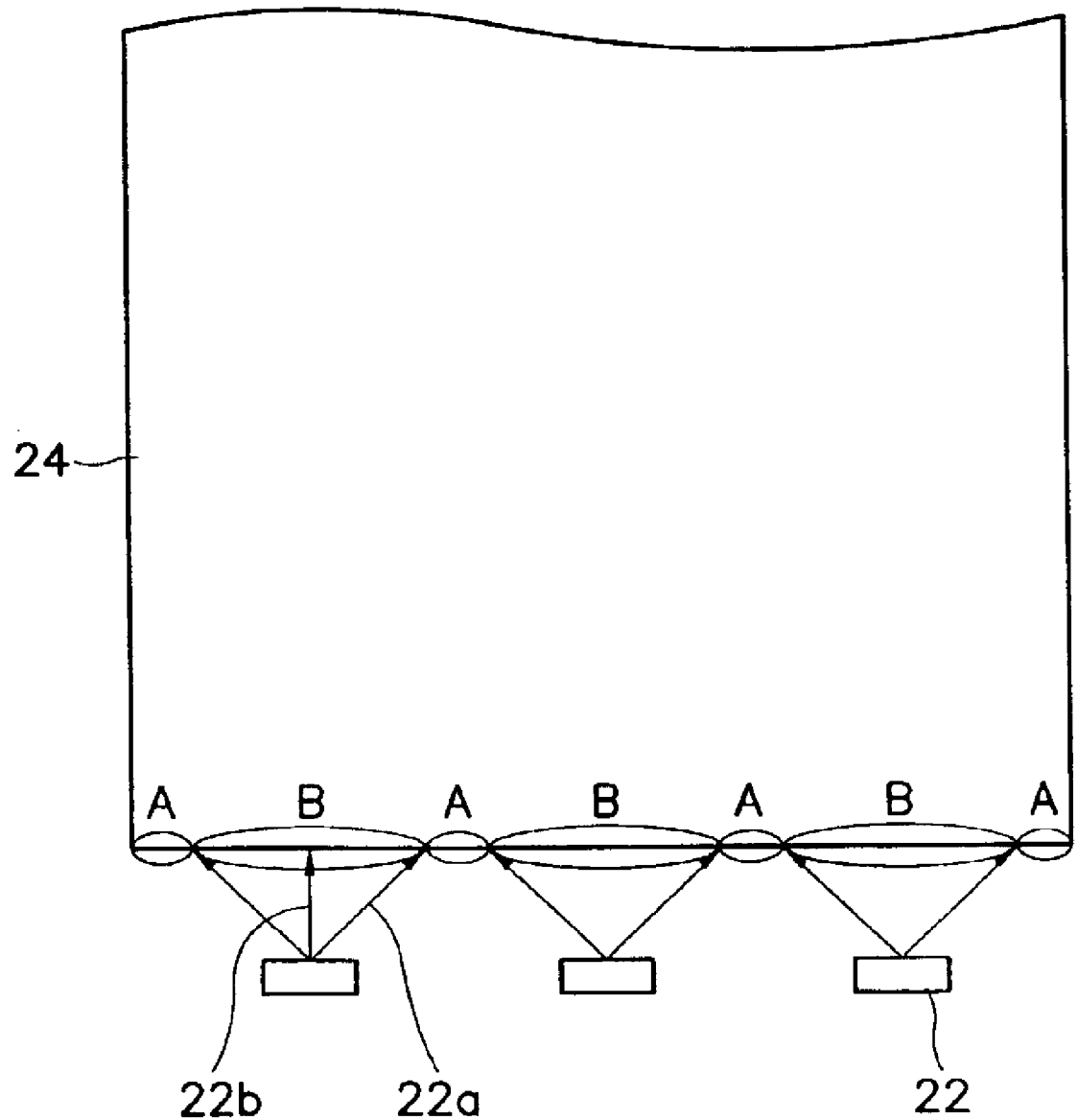

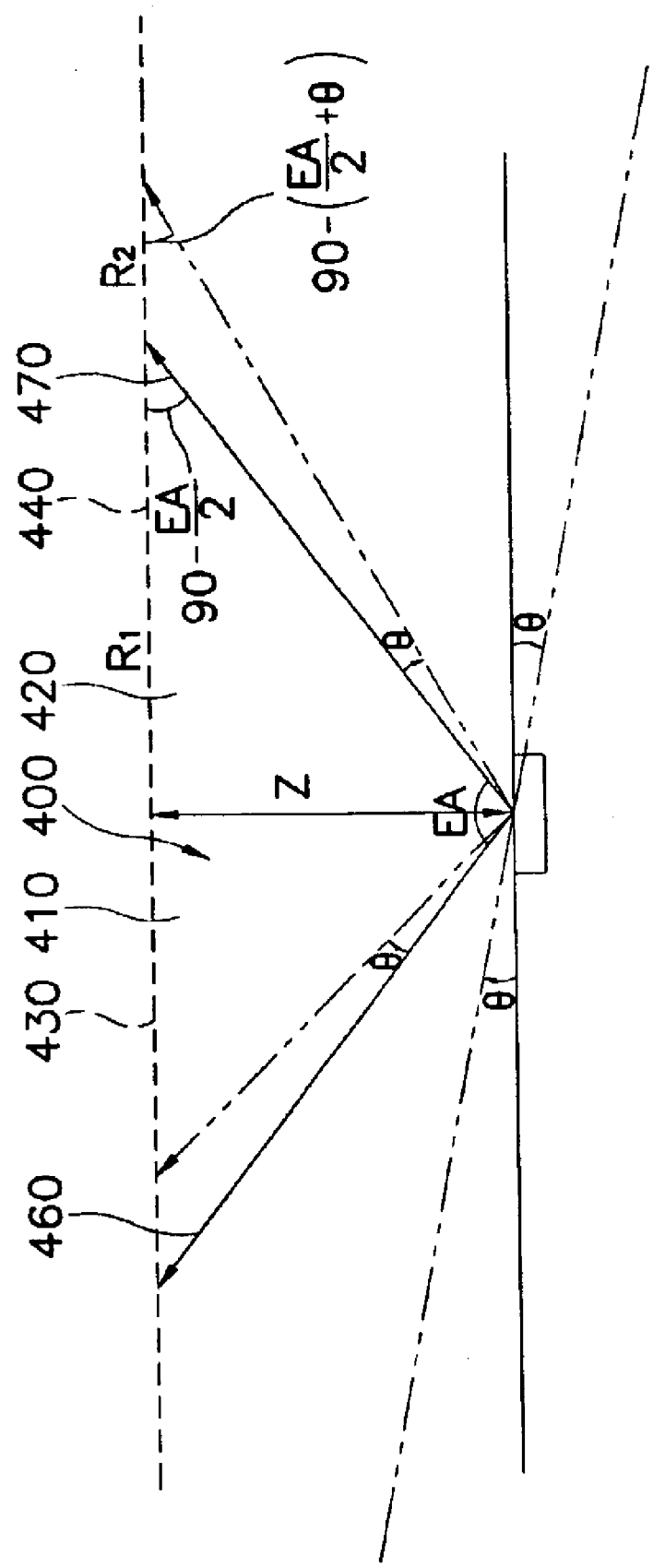

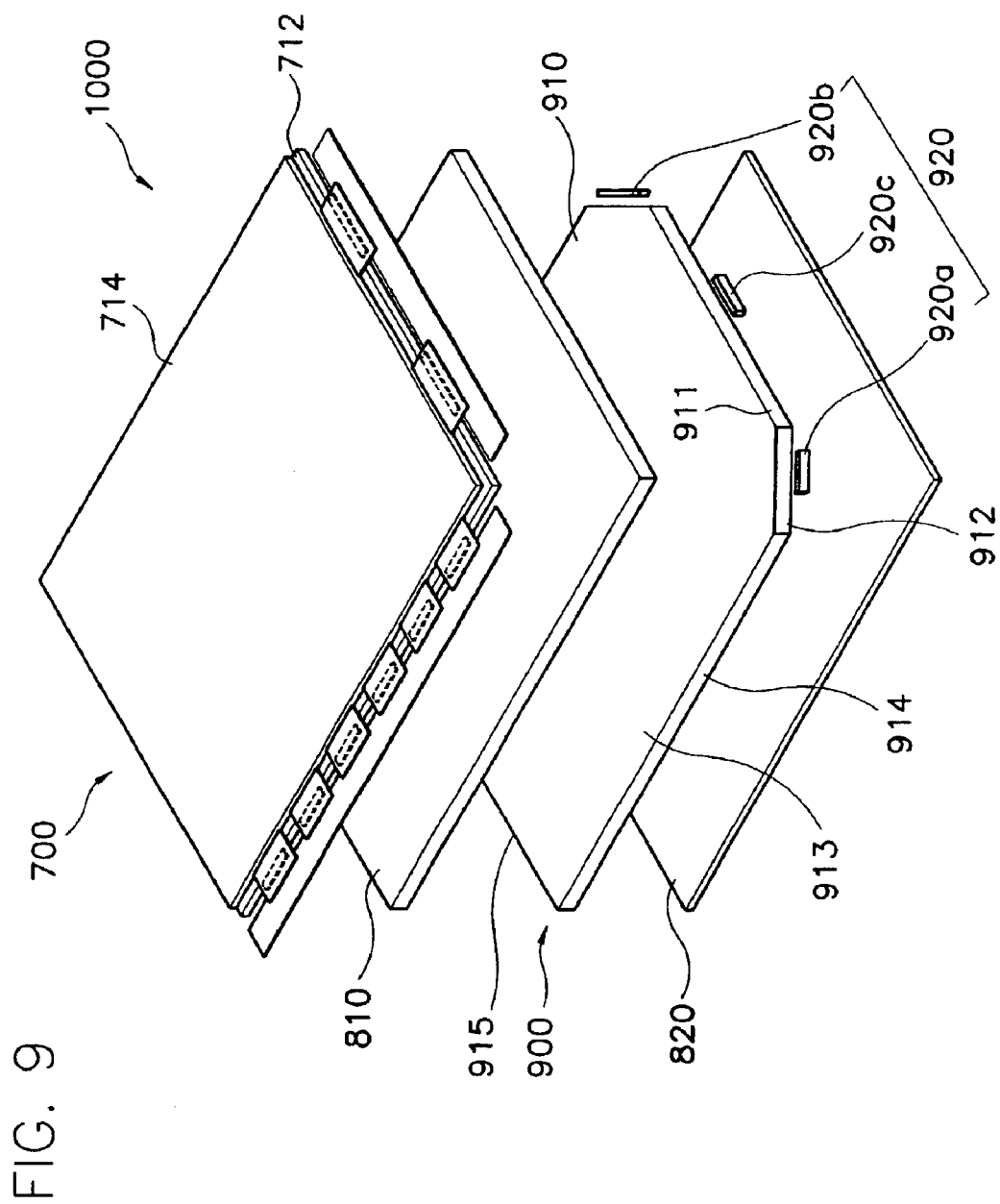

ILLUMINATING DEVICE AND DISPLAY APPARATUS USING THE SAME

BACKGROUND OF THE INVENTION

1. Field of the Invention

The present invention relates to a liquid crystal display apparatus, and more particularly to a liquid crystal display employing an illuminating device having a reduced number of light sources without degradation of display quality of the display apparatus.

2. Description of the Related Art

Recent developments on the semiconductor device technology tend to make electronic devices smaller in size and lighter in weight, and such electronic devices require a new electronic display device fitting to their smaller- and lighter-designed structure. Currently, flat panel display devices having a smaller size, lighter weight, lower driving voltage and lower power consumption have been demanded for the smaller- and lighter-designed electronic devices. Among various types of the flat panel display devices, liquid crystal display (LCD) type devices are most widely used for various types of electronic devices as well as the smaller-and lighter-designed electronic devices. This is because the LCD devices generally have the advantages of light weight, small size, low driving voltage and low power consumption while being capable of displaying images with full colors.

Since an LCD device needs light to display images thereon, a light source is required to generate the light for the LCD device. The display quality and appearance of images displayed by an LCD device vary depending on characteristics of the light source. The LCD devices may be classified into a reflection type LCD, which displays images using ambient light, and a transmission type LCD, which displays images using a back light source instead of the ambient light. In the early stage of LCD development, the reflection type LCD devices were widely used, but at present the transmission type LCD devices are more widely used to display high quality images. The light source of a transmission type LCD device is usually disposed at the back of an LCD panel, and the light emitted from the light source is called 'back light'.

As the light source of a transmission type LCD device, EL (Electro Luminescence), LED (Light Emitting Diode), CCFL (Cold Cathode Fluorescent Lamp) and HCFL (Hot Cathode Fluorescent Lamp) are widely used. In case of a portable electronic device such as personal mobile telephone (PCS phone or cellular phone) and personal digital assistant (PDA), the LED is usually used because of smaller size and lower power consumption. Especially, there has been a great increase in research on reducing the power consumption of the portable electronic devices, and recently, a research on reducing the number of LEDs has been intensively performed as one way of reducing the power consumption.

FIG. 1 is an exploded perspective view schematically showing the structure of a conventional LCD device for the small-sized products.

Referring to FIG. 1, the conventional LCD device 90 includes an LCD panel 10 for displaying an image, a backlight assembly 20 for supplying the light to the LCD panel 10, and a reflection sheet 30 for reflecting the light.

The LCD panel 10 includes an upper substrate 12 having a plurality of pixels for displaying images, a lower substrate 14 disposed under the upper substrate 12 and having a switching device 16 for electrically controlling each of the pixels, and liquid crystal (not shown) interposed between the upper and lower substrates 12 and 14, for controlling light transmittance in response to an intensity of an applied electrical field.

The backlight assembly 20 includes a light source 22 for emitting the light and a light guiding plate 24 for guiding the light emitted from the light source 22 to the LCD panel 10. The light source 22 is disposed at one side of the light guiding plate 24 and includes a light emitting diode (hereinafter referred to LED). It should be noted that the light source 22 may be disposed at each of the two opposite sides of the light guided plate 24 and include multiple LEDs. A reflection sheet 30 is disposed under the light guiding plate 24, for reflecting light leaked from the light guiding plate 24 toward the LCD panel 10 and improving light efficiency.

The switching device 16 controls the supply of electrical power to the pixels in response to image data externally provided. As a result, an electric field is formed at the position of a specific pixel between the upper and lower substrates 12 and 14, so that an aligning angle of the liquid crystal is changed in a predetermined direction. The light transmittance of the light supplied from the backlight assembly 20 is changed according as the aligning angle is changed, so that the amount of light transmitted through the liquid crystal varies according to the intensity of the electric field. The transmitted light selectively stimulates the pixels according to the image data to display an image corresponding to the image data on the LCD panel.

In the conventional LCD device, the backlight assembly 20 requires a plurality of the LEDs. However, since the LEDs are very expensive, a manufacturing cost of the LCD device inevitably increases as the number of required LEDs increases. Therefore, researches and developments have been made on the method of decreasing the number of the LEDs so as to reduce the manufacturing cost of the LCD device. Furthermore, a decrease in the number of required LEDs is also desired to reduce the power consumption of the LCD device.

However, when the number of required LEDs decreases so as to reduce the manufacturing cost and power consumption, there is a problem that luminance of the LCD device is deteriorated and the display quality of the LCD device decreases, which is a limit in decreasing the number of required LEDs.

FIG. 2A is a schematic view for explaining the light supply by a conventional illuminating device adopted as a component of backlight assembly of the conventional LCD device, and FIG. 2B is a schematic view explaining the light supply when the number of the LEDs in FIG. 2A is reduced into three.

Generally, when a luminous body of a point light source such as an LED emits light to a light guiding plate 24, the quantity of light at the angles of ±60° with respect to an imaginary line vertically connected between the light source (e.g., LED) and the light guiding plate 24 is about half of the quantity of light at the angle of 0°. The light emitted from the point light source travels to and reaches at a certain area of the light guiding plate 24, ranging from the right angle of 60° in the clockwise direction (hereinafter, referred to as "+60°") to the left angle of 60° in the counterclockwise direction (hereinafter, referred to as "−60°") with respect to the imaginary line vertically connected between the light source and the light guiding plate 24. When the light is radiated, the quantity of marginal light 22a which is traveling to the light guiding plate at the angle of +60° or −60°, is about half of that of central light 22b which is traveling to the light guiding plate 24 along a front direction at the angle of 0°. Therefore, the light quantity at a marginal region ②
of the light guiding plate 24 at which the marginal light 22a
arrives is about half of the light quantity at a central region
① of the light guiding plate 24 at which the central light 22b
arrives. Consequently, as shown in FIG. 2A, LEDs in the
light source are each installed such that the adjacent marginal lights arrive at the same marginal region of the light
guiding plate 24 to prevent a drop-off of the luminance due
to the reduction of light quantity at the marginal region ②
of the light guiding plate 24.

When the conventional illuminating device is adopted as
a light source of the backlight assembly of the LCD device,
the display quality of the LCD device is deteriorated due to
a quantity difference in the lights arriving at different regions
of the light guiding plate 24. In case that the number of the
LEDs decreases, the light generated from the light source 22
may not arrive at some portion of the light guiding plate 24.
As shown in FIG. 2B, since a distance between the adjacent
LEDs increases as the number of the LEDs decreases, the
light may not arrive at a portion of the light guiding plate 24,
which is corresponding to a region between marginal areas
at which the adjacent marginal lights arrive, respectively.
Therefore, in FIG. 2B, portion "B" of the light guiding plate
24 corresponding to an emitting region of each LED is more
bright than portion "A" of the light guiding plate 24 corresponding to a non-emitting region of each LED between the
adjacent marginal areas. Accordingly, a bright portion and a
dark portion are alternately shown on the LCD panel 10
disposed on the light guiding plate 24, which deteriorates the
display quality.

In order to prevent the display quality of the LCD device
from decreasing, various developments have been performed on the modified light guiding plate. For example,
there have been provided a light guiding plate including a
concave portion or a convex portion to serve as a lens, which
is disposed on the incident surface of the light guiding plate
onto which the light is incident, a light guiding plate
including a plurality of irregularities for scattering the light,
or a light guiding plate including a speculum structure
thereon for reflecting the light. However, the above-modified light guiding plates have an inevitable limit such as
a luminance drop. This is because the light generated from
a light source is incident into the light guiding plate 24 after
being reflected on the modified portion of the light guiding
plate 24.

BRIEF SUMMARY OF THE INVENTION

The present invention provides an illuminating device
having reduced number of LEDs in a light source and
luminance not subject to deterioration due to the reduction
of the number of the LEDs.

The present invention also provides a display apparatus
having such an illuminating device.

In one aspect of the invention, there is provided an
illuminating device for illuminating a display apparatus,
comprising: a light guiding part for guiding light to a display
unit of the display apparatus, the light guiding part including
an incident surface on which the light is incident, a back
surface reverse to the incident surface, an emitting surface
from which the light incident on the incident surface is
emitted to the display unit, side surfaces perpendicular to the
incident surface and the emitting surface, and a first chamfer
surface formed at a corner portion between the incident
surface and one of the side surfaces, in which the first
chamfer surface meets the incident surface at a chamfer
angle; and a first light source part for emitting the light to the
light guiding part, the first light source part including a first
marginal luminous body disposed corresponding to the first
chamfer surface and a first central luminous body optionally
disposed corresponding to the incident surface.

The light guiding part further comprises a second chamfer
surface symmetric to the first chamfer surface with respect
to a longitudinal central line thereof, and the first light
source part further comprises a second marginal luminous
body disposed corresponding to the second chamfer surface.
Also, the illuminating device further comprises a second
light source, and the light guiding part further comprises a
third chamfer surface and a fourth chamfer surface, wherein
the third chamfer surface is formed symmetric to the first
chamfer surface and the fourth chamfer surface is formed
symmetric to the second chamfer surface with respect to a
widthwise central line of the light guiding part, and the
second light source part includes a third marginal luminous
body disposed corresponding to the third chamfer surface, a
fourth marginal luminous body disposed corresponding to
the fourth chamfer surface and a second central luminous
body disposed corresponding to a back incident surface
disposed between the third and fourth chamfer surfaces. The
chamfer angle formed between the incident surface and one
of the first and second chamfer surfaces is less than an angle
of $$90 - \frac{EA}{2}$$

(wherein, EA indicates an emitting angle), and the luminous
body comprises a point light source such as a light emitting
diode.

In another aspect, there is provided a display apparatus for
displaying an image, comprising: a backlight assembly for
generating light, the backlight assembly including i) a light
guiding part for guiding the light, the light guiding part
having an incident surface on which the light is incident, a
back surface reverse to the incident surface, an emitting
surface from which the light incident on the incident surface
is emitted, side surfaces perpendicular to the incident surface
and the emitting surface, and a first chamfer surface formed
at a corner portion between the incident surface and one of
the side surfaces, wherein the first chamfer surface meets the
incident surface at a chamfer angle, and ii) a first light source
part for emitting the light to the light guiding part, the first
light source part having a first marginal luminous body
disposed corresponding to the first chamfer surface, and a
first central luminous body optionally disposed corresponding to the incident surface; and a display unit disposed on the
emitting surface for displaying images using the light supplied from the backlight assembly.

The light guiding part further comprises a second chamfer
surface symmetric to the first chamfer surface with respect
to a longitudinal central line thereof, and the first light
source part further comprises a second marginal luminous
body disposed corresponding to the second chamfer surface.
Also, the illuminating device further comprises a second
light source, and the light guiding part further comprises a
third chamfer surface and a fourth chamfer surface, wherein
the third chamfer surface is formed symmetric to the first
chamfer surface and the fourth chamfer surface is formed
symmetric to the second chamfer surface with respect to a
widthwise central line of the light guiding part, and the
second light source part includes a third marginal luminous
body disposed corresponding to the third chamfer surface, a
fourth marginal luminous body disposed corresponding to
the fourth chamfer surface and a second central luminous body disposed corresponding to a back incident surface disposed between the third and fourth chamfer surfaces. The chamfer angle formed between the incident surface and one of the first and second chamfer surfaces is less than an angle of $$90 - \frac{EA}{2}$$

(herein, EA is the emitting angle), and the luminous body comprises a point light source such as a light emitting diode.

The display apparatus further comprises a light scattering member formed on a bottom portion of the light guiding part, for scattering the light provided from the incident surface to the emitting surface, a light diffusion member disposed between the emitting surface and the display unit for increasing light uniformity of the display unit, and a light reflection member disposed below the light guiding part for reflecting the light. The display unit includes a color filter substrate having pixels for presenting colors, a thin film transistor substrate disposed below the color filter substrate and having a thin film transistor for electrically controlling each of the pixels, and liquid crystal interposed between the color filter substrate and the thin film transistor substrate for controlling light transmittance according to electric field intensity.

According to the present invention, even when the number of light sources is reduced, the luminance and display quality are prevented from being deteriorated by disposing a light source at a corner portion of the light guiding part.

BRIEF DESCRIPTION OF THE DRAWINGS

The above and other advantages of the present invention will become readily apparent by reference to the following detailed description when considered in conjunction with the accompanying drawings wherein:

FIG. 2A is a schematic view for explaining the light supply by a conventional illuminating device adopted as a component of backlight assembly of the conventional LCD device;

FIG. 2B is a schematic view for explaining the light supply when the number of the LEDs shown in FIG. 2A is reduced into three;

FIG. 6 is a schematic view for illustrating the relationship between the chamfer angle and the emitting area;

FIG. 9 is an exploded perspective view schematically showing a display apparatus including the illuminating device according to an embodiment of the present invention.

DETAILED DESCRIPTION OF THE INVENTION

Figure 1:
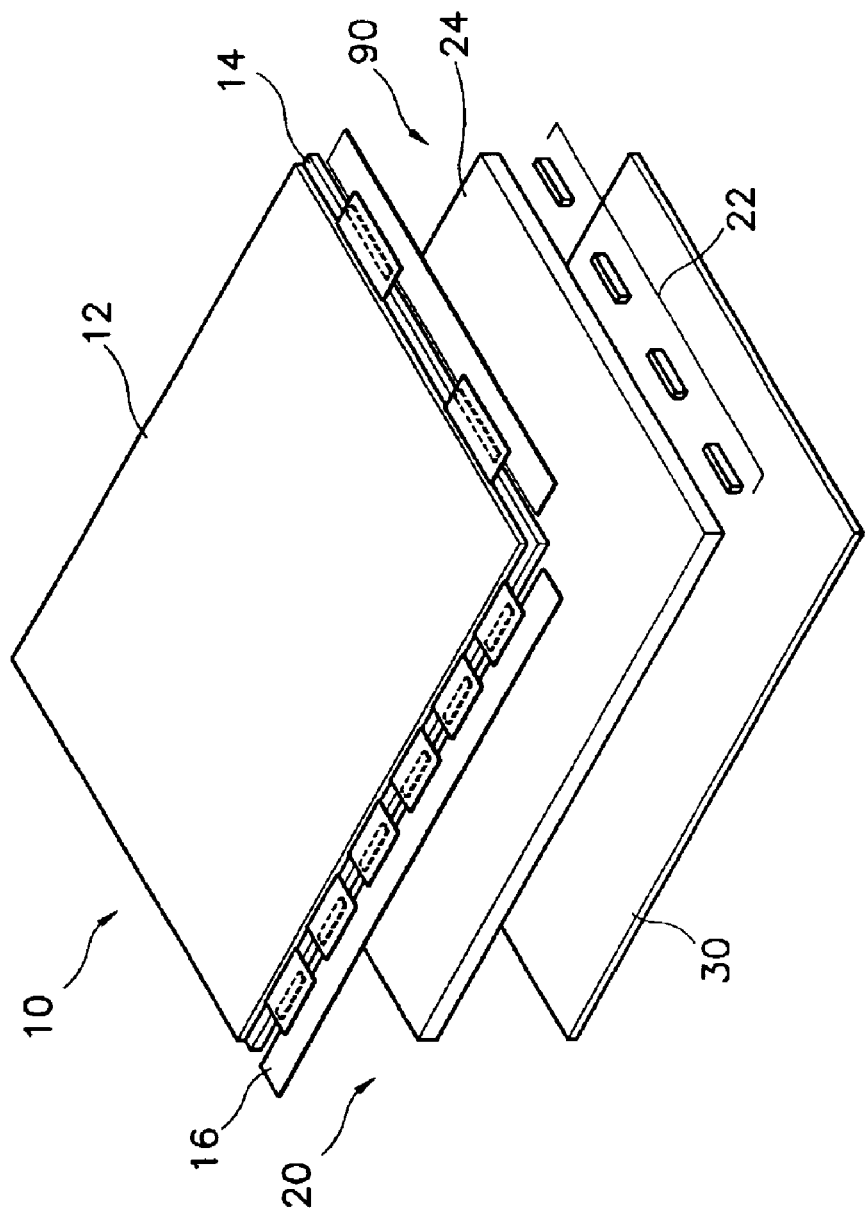
FIG. 1 is an exploded perspective view schematically showing a structure of a conventional LCD device.
Figure 3A:
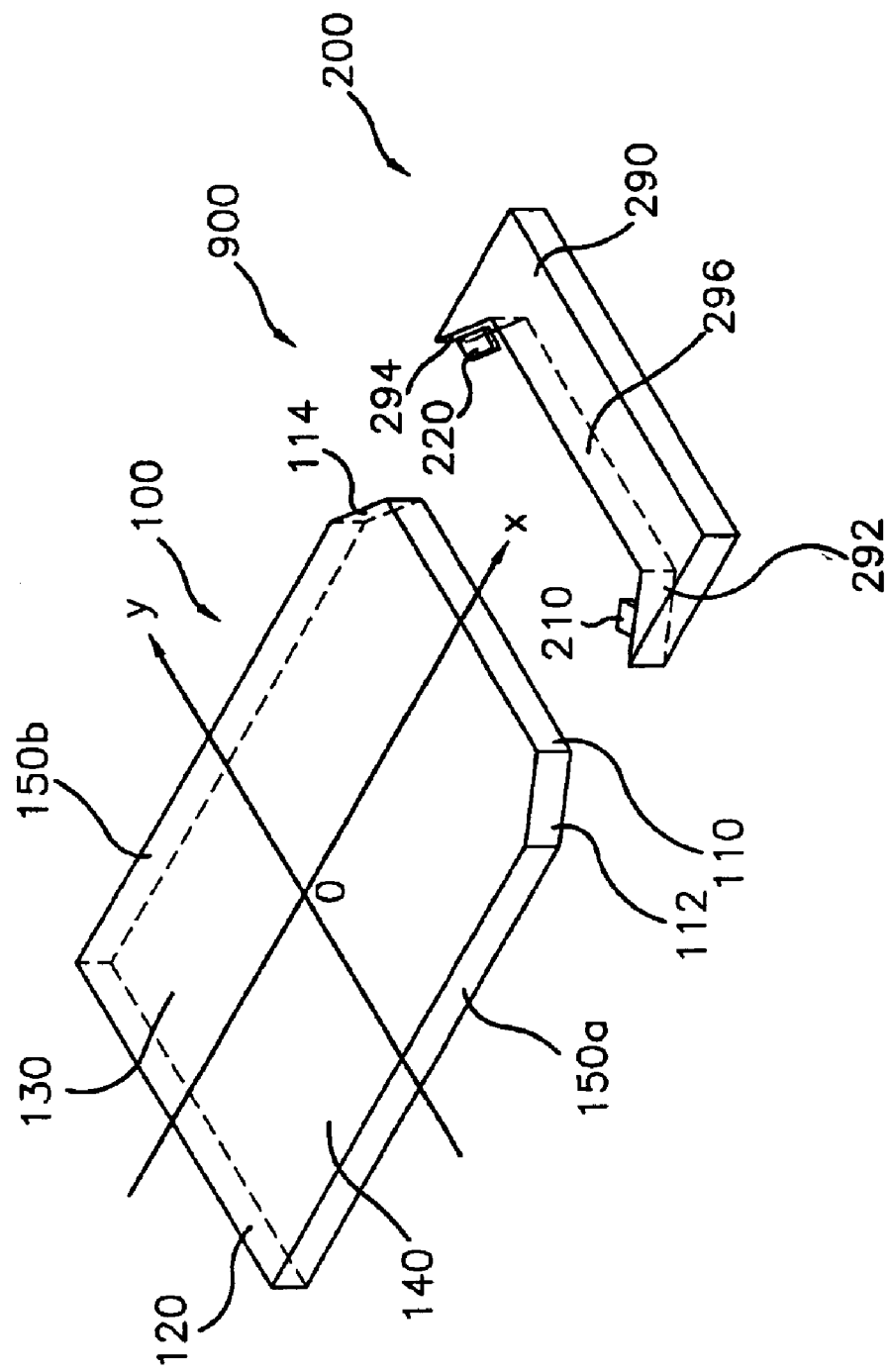
FIG. 3A is an exploded perspective view schematically showing a structure of an illuminating device according to a first embodiment of the present invention.
Figure 4:
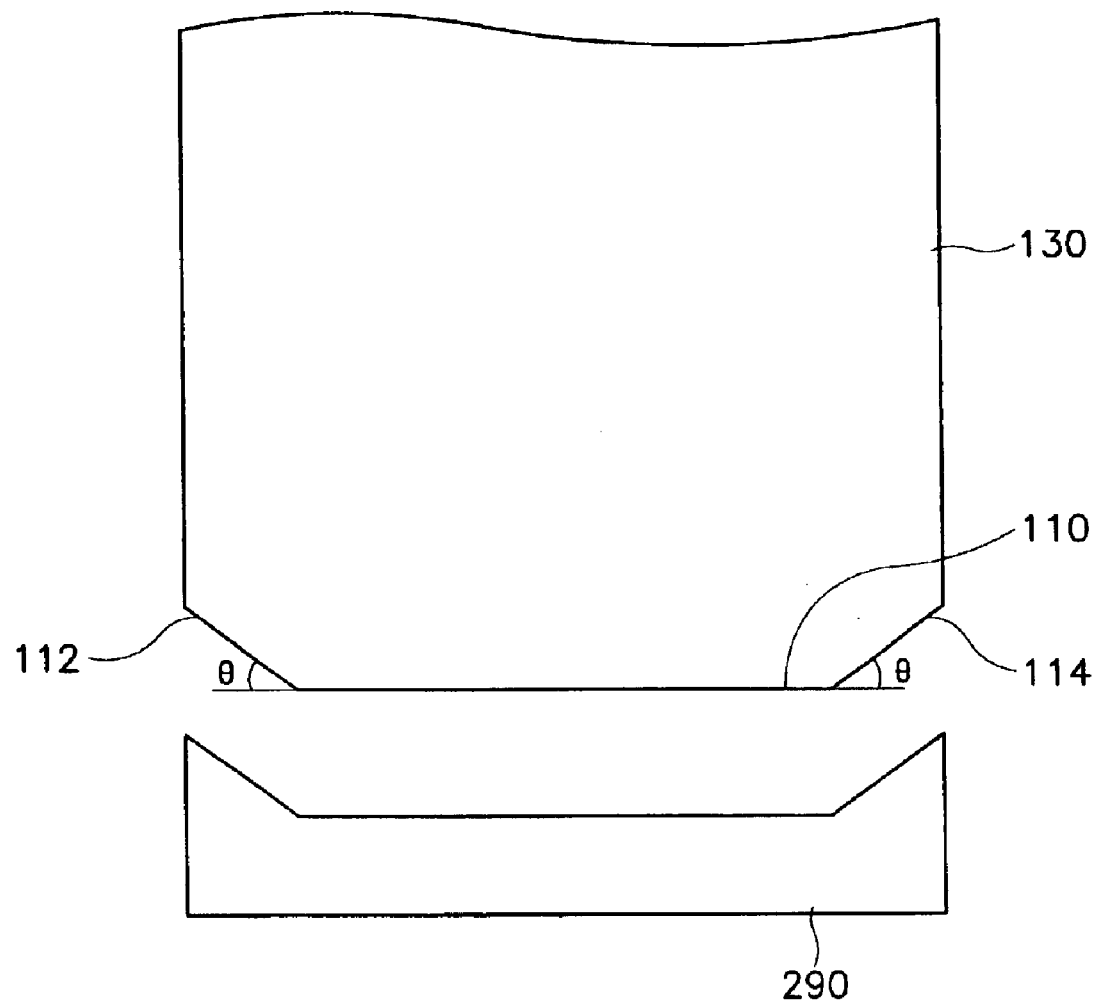
FIG. 4 is a plan view schematically showing an incident surface of the illuminating device shown in FIG. 3A.

FIG. 3A is an exploded perspective view schematically showing a structure of an illuminating device according to an exemplary embodiment of the present invention and FIG. 4 is a plan view schematically showing an incident surface of the illuminating device shown in FIG. 3A. Hereinafter, a line passing through an incident surface 110 of the light guiding plate 100 via a geometrical center O of the light guiding plate 100 is defined as a longitudinal central line of the light guiding plate 100, and a line vertical to the longitudinal central line via a geometrical center O of the light guiding plate 110 is defined as a widthwise central line of the light guiding plate 100.

Referring to FIGS. 3A and 4, an illuminating device 900 according to an embodiment of the present invention includes a light guiding part 100 for guiding light and a first light source part 200 for supplying the light to the light guiding part 100.

The light guiding part 100 has a polygonal plate shape with a predetermined thickness, and as an exemplary embodiment, the light guiding part 100 has a rectangular parallelepiped shape. The light guiding part 100 includes an incident surface 110 onto which the light is incident, a back surface 120 opposite to the incident surface 110, an emitting surface 130 from which the light incident on the incident surface is emitted to a display unit on which an image is displayed, a bottom surface 140 opposite the emitting surface 130, and side surfaces 150 perpendicular to the incident surface 110 and the emitting surface 130. The side surfaces 150 include a first side surface 150a and a second side surface 150b opposite to the first side surface 150a. As an exemplary embodiment, the light guiding part 100 is made of a material of polymethyl methacrylate (PMMA) family through an injection molding. The PMMA family material is excellent in mechanical strength and refractoriness and is so transparent that transmittance of a visible ray is superior.

A light scattering member is disposed on the bottom surface 140 of the light guiding part 100 so as to reflect the incident light to the emitting surface 130. As an exemplary embodiment, scattering ink (not shown) may be printed on the bottom surface 140 for vertically scattering the incident light, or a plurality of geometrical elements (not shown) may be formed on the bottom surface 140 for reflecting, refracting or scattering the light.

A first chamfer surface 112 is formed by vertically cutting off a corner portion between the incident surface 110 and the first side surface 150a of the light guiding part 100 at a chamfer angle θ measured from the incident surface 110. Therefore, the first chamfer surface 112 is perpendicular to both the emitting surface 130 and the bottom surface 140, and contiguous to the incident surface 110 at the chamfer angle θ at one end and to the first side surface 150a at a complementary angle of the chamfer angle θ at the other end. A second chamfer surface 114 is formed by vertically cutting off a corner portion between the incident surface 110 and the second side surface 150b of the light guiding part 100 at a chamfer angle θ measured from the incident surface 110, so that the second chamfer surface 114 is symmetric to the first chamfer surface 112 with respect to the longitudinal central line thereof. Consequently, the light guiding part 100 has a symmetrical shape with respect to the longitudinal central line thereof, and therefore the load of the light guiding plate 100 is distributed symmetrically with respect to the longitudinal central line of the light guiding plate 100.

Figure 3B:
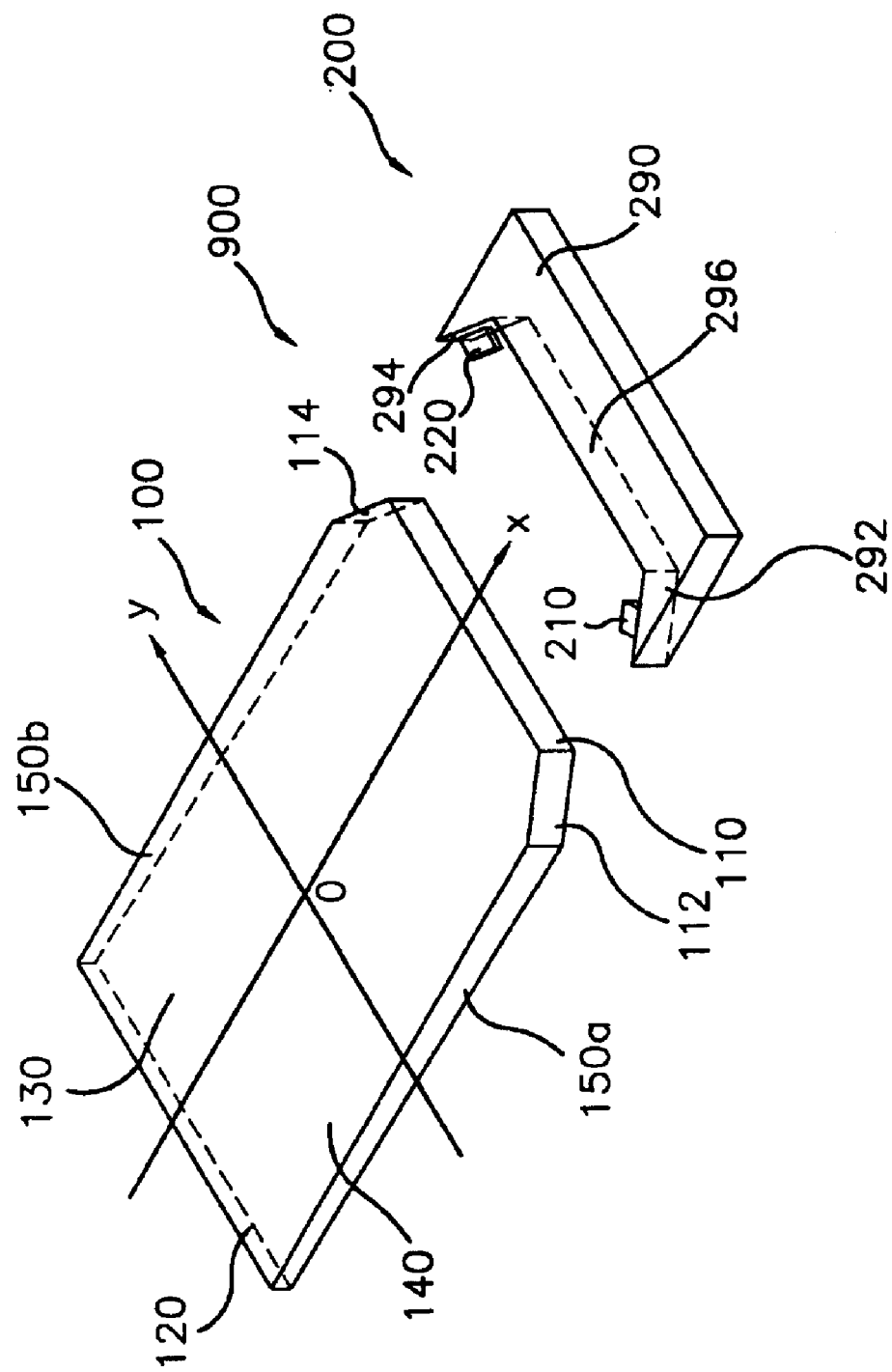
FIG. 3B is an exploded perspective view schematically showing a structure of an illuminating device according to another embodiment of the present invention.

FIG. 3B is an exploded perspective view schematically showing a structure of an illuminating device according to another embodiment of the present invention.

Referring to FIG. 3B, the present invention may have another embodiment such that the thickness of the light guiding part 100 (i.e. the width of the side surfaces 150) is linearly decreased from the incident surface 110 to the back surface 120, so that the light guiding part 100 has a wedge shape. Accordingly, the incident light is uniformly emitted over the entire emitting surface 130 by reducing an incidence angle of the incident light against the emitting surface 130, and the display apparatus becomes lighter and slimmer.

The first light source part 200 includes a luminous body for generating the light and a supporter 290 for supporting the luminous body. As an exemplary embodiment, the luminous body includes a first marginal luminous body 210 corresponding to the first chamfer surface 112 and a second marginal luminous body 220 corresponding to the second chamfer surface 114. The luminous body may further include one or more central luminous body corresponding to the incident surface 110. The supporter 290 includes a first surface 292 disposed parallel to the first chamfer surface 112, a second surface 294 disposed parallel to the second chamfer surface 114, and a third surface 296 disposed parallel to the incident surface 110. The supporter 290 includes a fixing portion (not shown) respectively disposed on the first, second and third surfaces for fixing the luminous body to the supporter 290. The supporter 290 having the fixing portion is installed in such a manner that the luminous body is disposed adjacent to the first chamfer surface 112, the second chamfer surface 114 and the incident surface 110. In this embodiment of the present invention, the luminous body is fixed to the light guiding part 100 using an additional member, the supporter 290. However, in another embodiment of the present invention, the luminous body may be integrally fixed onto the light guiding part 100, so that no supporter is needed for the fixing purpose.

The first and second marginal luminous bodies 210 and 220 each include a light emitting diode (LED) to minimize the size of the display apparatus. An LED emits light in response to electrical current applied thereto, and has some advantages such as price, high reliance, easy modulation and stable operation. Especially, an LED emits light in the range of a predetermined angle, defined as an "emitting angle," even though the LED is a point light source, so that the LED provides the light to the light guiding part 100 to form an emitting region corresponding to the emitting angle. The emitting angle is about 120°, which is made up of +60° and −60° with respect to the imaginary line vertically connected between the center of the LED and the light guiding plate 100. The angle +60° corresponds to a right portion of the emitting region, and the angle −60° corresponds to a left portion of the emitting region. Therefore, the light generated from one LED arrives at the emitting region of the light guiding plate 100. The quantity of light arriving at a marginal portion of the emitting region, which is about the angle of 60° clockwise or counterclockwise from the imaginary line is about half of the quantity of light arriving at a central portion of the emitting region, which is about the angle of 0° from the imaginary line.

Figure 5:
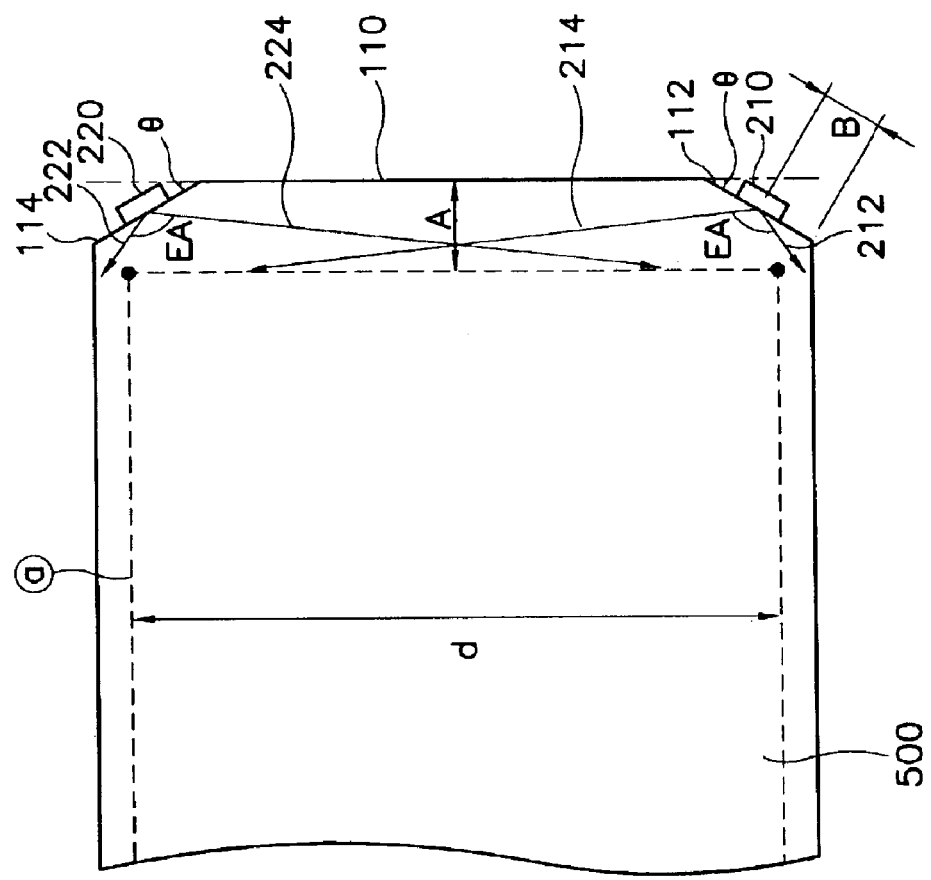
FIG. 5 is a schematic view for explaining light supply in the illuminating device shown in FIG. 3A.

FIG. 5 is a schematic view for explaining the light supply in the illuminating apparatus shown in FIG. 3. In the illuminating apparatus in FIG. 5, the supporter and the light guiding part are coupled to each other, and the supporter is not shown for the sake of convenience of understanding. Also, an active area 500 of the light guiding plate is surrounded by dotted line ⓐ. According to a display apparatus adopting the illuminating device as a backlight assembly, the incident light is effectively emitted to the display panel of the display apparatus through the active area 500 and an image is effectively formed. As described above, since the corner portion of the light guiding part 100 is removed so as to form the first and the second chamfer surfaces 112 and 114, the light cannot reach to at least a corner portion of the display panel. Therefore, the active area 500 for providing the light to the display panel and displaying an image is separated from the incident surface 110 by a predetermined distance A.

Referring to FIG. 5, the first and second marginal luminous bodies 210 and 220 respectively disposed on the first and second chamfer surfaces 112 and 114 provide the light to the light guiding part 100 at a predetermined emitting angle "EA". That is, the first marginal luminous body 210 emits the light to the light guiding part 100 to form a first emitting region between a first emitting ray 212 and a second emitting ray 214 corresponding to the emitting angle "EA". The second marginal luminous body 220 also emits the light to the light guiding part 100 to form a second emitting region between a third emitting ray 222 and a fourth emitting ray 224 corresponding to the emitting angle "EA". Since each of the luminous bodies 210 and 220 is slantingly disposed on the corner portion of the light guiding part 100 parallel to the chamfer surface at the chamfer angle θ, the second and fourth emitting rays 214 and 224 reach farther towards a corner portion of the active area 500 opposite to the first and second marginal luminous bodies 210 and 220, respectively. Accordingly, width "d" of the active area 500 is entirely covered by the first and second emitting regions.

Therefore, the active area 500 to which the light is provided may have various dimensions each having a different width by adjusting the chamfer angle θ and/or center distance "B" of the chamfer surface defined as a distance from an edge line to the center of the chamfer surface, which is connected to the corresponding side surface of the light guiding part. In other words, on condition that the spacing distance "A" between the incident surface 110 and the active area 500 is constant, the chamfer angle θ and the center distance B increase as the width "d" of the active area 500 increases, so that the emitting region through which the light generated from each of the luminous bodies 210 and 220 is incident is enlarged. Therefore, even though the width "d" of the active area 500 increases, the light can be fully emitted to the enlarged active area 500. When the width "d" of the active area 500 is so much increased that a portion of the width "d" of the active area 500, which is defined as a "dark portion," is not covered by the first and second emitting regions, at least one central luminous body is installed on the incident surface 110 at a position corresponding to the dark portion of the width "d" of the active area 500. Therefore, the light emitted from the central luminous body is provided to the dark portion of the width "d" of the active area 500. An illuminating device including the central luminous body is described in detail below.

On the contrary, when the width "d" of the active area 500 decreases, the chamfer angle θ and the central distance B become smaller. The chamfer angle θ and the central distance B are set to be such a dimension that the width "d" of the active area 500 is fully covered by the first and second emitting regions in order that the light generated from the first and second marginal luminous bodies 210 and 220 can reach at the active area 500, which can improve the light efficiency of the first and second marginal luminous bodies 210 and 220. It is noted that a plurality of the central luminous bodies can be installed on the incident surface 110 so as to improve the luminance of the LCD.

FIG. 6 is a schematic view for illustrating the relationship between the chamfer angle and the emitting region. The dotted line indicates the width of the active area, and the solid line opposite to the dotted line indicates an incident surface on which a luminous body is installed, which is parallel to the active area. The solid arrow lines indicate the range of light emitted from the luminous body that is not slanted. Further, the two-dotted chain line indicates the incident surface slanted at the chamfer angle θ and the two-dotted chain arrow line indicates the range of light emitted from the luminous body slanted at the chamfer angle θ.

Referring to FIG. 6, when the luminous body is disposed parallel to the active area 500 at the chamfer angle 0°, the emitting region 400, which is in the range from a first marginal ray 460 to a second marginal ray 470 corresponding to the emitting angle "EA", is symmetric with respect to the imaginary line vertically connected between the center of the luminous body and the active area 500. Therefore, the emitting region 400 is divided into two portions of the same shape and dimension, a first portion 410 of the emitting region and a second portion 420 of the emitting region. Accordingly, the size of the emitting region 400 is determined by an incident distance $R_1$, a distance on the emitting area from a central point at which a front ray of the emitting angle 0° arrives to a marginal point at which the second marginal ray 470 of the emitting angle $$\frac{EA}{2}$$

arrives, expressed as follows.

$$R_1 = \frac{A}{\tan\left(90 - \frac{EA}{2}\right)}$$

wherein, A is a spacing distance between the incident surface and the active area, and EA is the emitting angle of the luminous body.

If the luminous body is installed to be slanted at the chamfer angle θ with respect to the active area, the second marginal ray 470' of the light emitted from the slanted luminous body reaches to the active area at the emitting angle of $$\frac{EA}{2} + \theta,$$

and the first marginal ray 460' of the emitted light reaches to the active area at the emitting angle of $$\frac{EA}{2} - \theta,$$

so that the first portion of the emitting region is reduced and the second portion of the emitting region is increased. Accordingly, the size of the second portion of the emitting region is enlarged and determined by the increased incident distance $R_2$, a distance on the emitting area from a central point at which a front ray of the emitting angle 0° arrives to a marginal point at which the second marginal ray 470' of the emitting angle $$\frac{EA}{2} + \theta$$

arrives, expressed as follows.

$$R_2 = \frac{A}{\tan\left(90 - \left(\frac{EA}{2} + \theta\right)\right)}$$

wherein, A is a spacing distance between the incident surface and the active area, and EA is the emitting angle of the luminous body.

Therefore, the emitting region through which the light is emitted into the active area increases as the chamfer angle θ increases.

As shown in FIG. 5, the first and second marginal luminous bodies 210 and 220 are respectively disposed parallel to the chamfer surfaces 112 and 114 and symmetrically disposed with respect to the longitudinal central line of the light guiding part 100. Therefore, the first and second marginal luminous bodies 210 and 220 each provide light to a region of the active area having the increased incident distance $R_2$. As a result, the total increased incident distance, which is at most two times the increased incident distance $R_2$, is long enough to cover the width "d" of the active area 500 by adjusting the chamfer angle θ. In other words, the light can be fully incident on all the width "d" of the active area 500 by slantingly disposing the first and second marginal luminous bodies 210 and 220 at corner portions of the light guiding part 100.

When the chamfer angle θ is equal to or larger than $$90 - \frac{EA}{2},$$

the increased incident distance $R_2$ becomes infinite, so that the light generated from the first and second marginal luminous bodies 210 and 220 travel parallel to the incident surface 110 and cannot be emitted to the active area 500, which remarkably reduces the light efficiency. Therefore, the chamfer angle is required to be less than $$90 - \frac{EA}{2}.$$

For an example, when the emitting angle of an LED is 120°, the chamfer angle θ is less than 30° for emitting the light into the light guiding part 100. In other words, the chamfer angle θ is set less than a complementary angle of half the emitting angle, so that the light generated from the first and second marginal luminous bodies 210 and 220 is not deviated from the active area 500.

Consequently, the number of the luminous bodies can be reduced in various dimension of the light guiding part 100 without dropping the luminance uniformity off. The present embodiment discloses the illuminating device in which the number of luminous bodies is reduced from three to two, but the above-described method may also be applied to an illuminating device having four or more luminous bodies. In addition, formation of the dark portion on the light guiding part is prevented by increasing the incident distance on the width of the active area. Therefore, even when the number of the luminous bodies is reduced, deterioration of the luminance uniformity due to the dark portion on the light guiding part can be prevented.

Figure 7A:
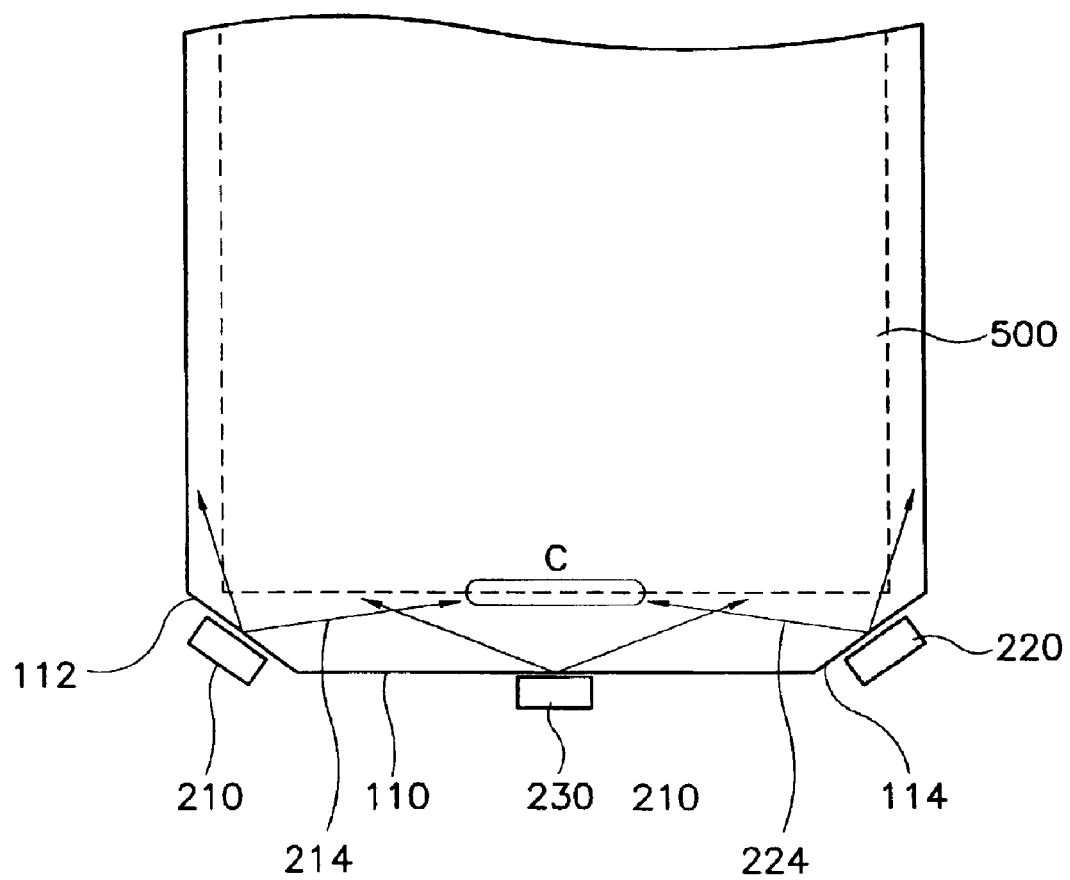
FIGS. 7A and 7B are schematic views showing an illuminating device having one or more central luminous bodies corresponding to an incident surface.
Figure 7B:
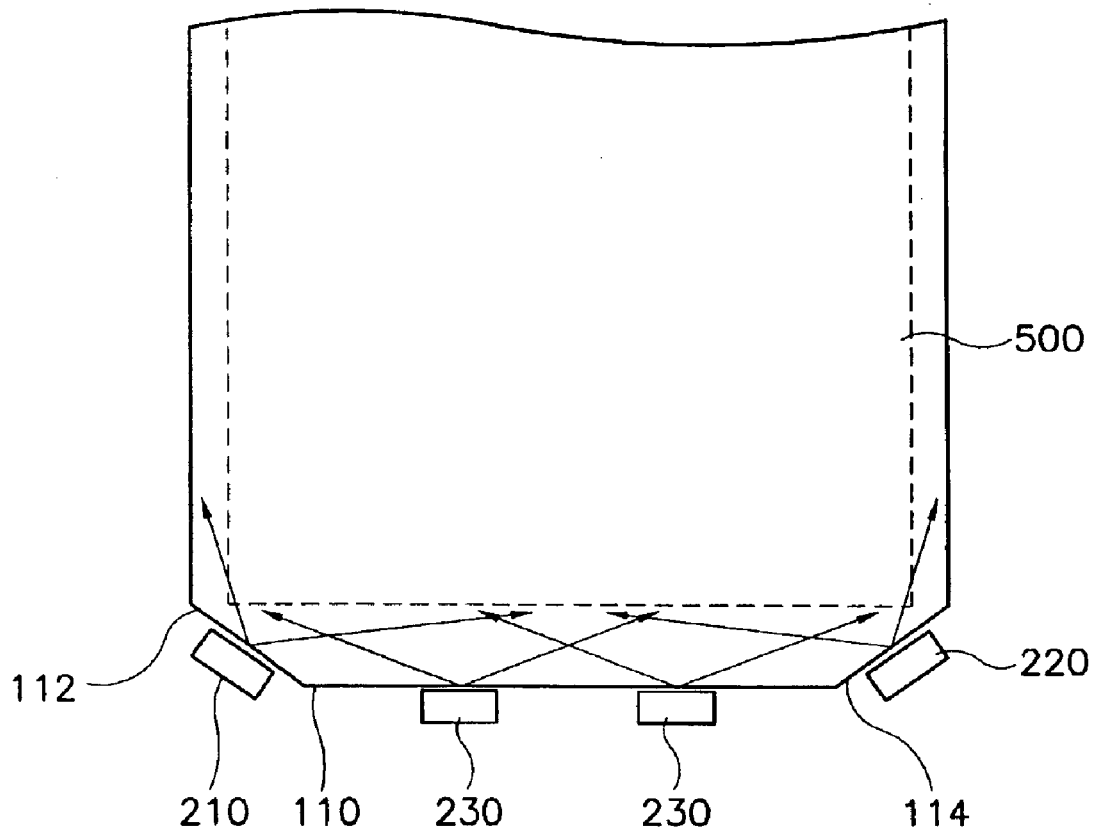

FIGS. 7A and 7B are schematic views showing an illuminating device having one or more central luminous bodies disposed on the incident surface. FIG. 7A shows the illuminating device including one central luminous body and FIG. 7A shows the illuminating device including two central luminous bodies.

Referring to FIGS. 7A and 7B, at least one central luminous body is installed at a center portion of the incident surface 110, so that the light is emitted to an interconnection region in which the second emitting ray of the first marginal luminous body 210 and the fourth emitting ray of the second marginal luminous body 220. Especially, when the sum of the symmetrically-increased incident distance R2 of the luminous body disposed on both corner portions of the light guiding part is less than the width "d" of the active area 500, the dark portion appears on the light guiding part 100 since the light cannot be emitted to the entire active area 500. The central luminous body 230 provides the light to the dark portion of the light guiding part 100, which prevents the luminance uniformity from being dropped off even though the width of the active area is increased. In case that one or more luminous bodies are removed from an illuminating device including four or more luminous bodies, the remaining luminous bodies except the luminous bodies disposed on the first and the second chamfer surfaces are disposed on the incident surface 110 such that the light emitted from the remaining luminous bodies covers the dark portion, if any, so as to prevent deterioration of the luminance uniformity.

Figure 8:
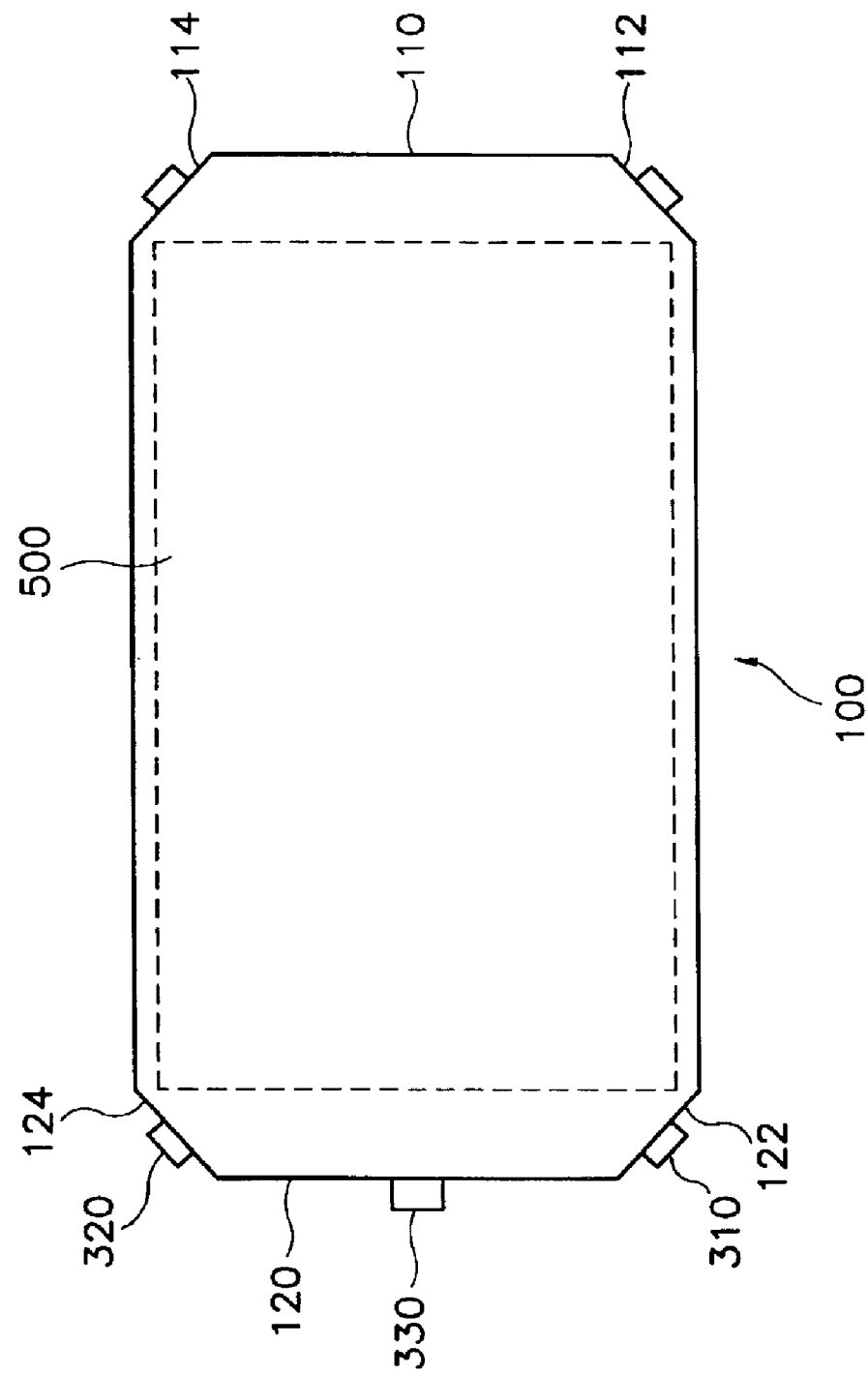
FIG. 8 is a plan view schematically showing an illuminating device with multiple light sources according to the present invention.

FIG. 8 is a plan view schematically showing an illuminating device according to another embodiment of the present invention. The illuminating device according to this embodiment has a structure similar to that of the illuminating device according to the embodiment in FIG. 3A, except that light source parts in this embodiment include luminous bodies and chamfer surfaces to be symmetric with respect to the widthwise-central line of the light guiding part. Therefore, the structural elements of the illuminating device according to this embodiment in FIG. 8, which are the same as those of the illuminating device according to the embodiment in FIG. 3A, have the same reference numerals as shown in the illuminating device according to the embodiment in FIG. 3A.

Referring to FIG. 8, a third chamfer surface 122 and a fourth chamfer surface 124 are disposed at the corner portions, respectively, of the back surface of the light guiding part 300. The third chamfer surface 122 is symmetric to the first chamfer surface 112 and the fourth chamfer surface 124 is symmetric to the second chamfer surface 114 with respect to the widthwise-central line of the light guiding part 300. Thus, a second light source part associated with the back surface is installed symmetrically to the first light source part 200 associated with the incident surface and the first and second chamfer surfaces. As an exemplary embodiment, the second light source part includes a plurality of luminous bodies for generating light and a supporter for supporting the luminous bodies. The luminous bodies include a third marginal luminous body 310 corresponding to the third chamfer surface 122 and a fourth marginal luminous body 320 corresponding to the fourth chamfer surface 124, and may further include at least one central luminous body 330 corresponding to a central portion of a back incident surface 130.

Since the corner portions of the back surface are cut off to form the third and fourth chamfer surfaces 122,124 of the light guiding part 300, the active area 500 of the light guiding part 300 becomes smaller than the active area 500 of the light guiding part 100 in FIGS. 3A–7. Therefore, the luminance of the backlight assembly employing the embodiment in FIG. 8 is increased and the luminance uniformity is also improved since the number of luminous bodies is increased.

FIG. 9 is an exploded perspective view schematically showing the structure of a display apparatus including the illuminating device according to one of the embodiments of the present invention. It should be noted that although the display apparatus in FIG. 9 employs the illuminating device 900 according to the embodiment in FIG. 3A as an exemplary embodiment, the display apparatus of the present invention may employ the illuminating device according to the embodiment in FIG. 8.

Referring to FIG. 9, the display apparatus 1000 includes a display unit 700 for displaying images according to image data, an illuminating device 900 for emitting light to the display unit 700, a light diffusion member 810 for increasing light uniformity of the display unit, and a reflection unit 820 for reflecting the light so as to improve the light efficiency.

The display unit 700 displays an image according to electrical signals supplied from a data processing unit. The display unit 700 includes a color filter substrate 714 having a plurality of pixels for forming an image, a thin film transistor substrate 712 disposed under the color filter substrate 714 for electrically controlling each of the pixels, and liquid crystal (not shown) interposed between the color filter substrate 714 and the thin film transistor substrate 712, for controlling light transmittance according to the intensity of electric field formed between the color filter substrate 714 and the thin film transistor substrate 712.

The thin film transistor substrate 712 includes a plurality of supplying members (not shown) for supplying and controlling the electrical image signals disposed on periphery portion thereof. The supplying members (not shown) supply driving signals and timing signals to gate lines and data lines of the thin film transistor, respectively, and control an aligning angle and timing of the liquid crystal.

The backlight assembly including the illuminating device 900 is installed under the display unit 700 so as to uniformly provide the light to the display unit 700.

The illuminating device 900 includes a light guiding plate 910 for guiding the light to the display unit 700 and a plurality of luminous bodies 920 for generating light and supplying the light into the light guiding plate 910. The light guiding plate 910 has a flat shape with a predetermined thickness and corner portions thereof are removed. In other words, the light guiding part 910 includes a incident surface 911 on which the light is incident, a back surface 915 opposite to the incident surface 911, an emitting surface 930 from which the light is emitted to the display unit 700, side surfaces 914 perpendicular to both the incident surface 911 and the emitting surface 930, a first chamfer surface 912 and a second chamfer surface formed by removing the edge portions of the incident surface 911 connected to the side surfaces 914. The light guiding part 910 has a wedge shape, so that the thickness of the light guiding part 910 is linearly decreased from the incident surface 911 to the back surface 915.

In another embodiment, the light guiding part may further include third and fourth chamfer surfaces (referring to FIG. 8) symmetrical to the first and second chamfer surfaces, respectively, with respect to the widthwise central line of the light guiding part, and additional luminous bodies corresponding to the third and fourth chamfer surfaces may be installed.

Referring again to FIG. 9, a plurality of luminous bodies 920 for generating light and supplying the light to the light guiding part 910 includes a first luminous body 920a corresponding to the first chamfer surface 912, a second luminous body 920b corresponding to the second chamfer surface and at least one central luminous body 920c optionally installed corresponding to the incident surface 911. The luminous bodies 920 may be installed into the housing including the backlight assembly and the display unit 700, or may be supported and fixed by an additional supporter. For example, LEDs may be used as the luminous bodies 920.

The light diffusion member 810 includes a plurality of diffusion sheets installed between the emitting surface 913 and the display unit 700, for changing a path of the light emitted from the emitting surface 930 at an arbitrary angle to a front direction of the emitting surface 930 at right angle so as to improve the luminance of the display unit 700. Furthermore, a reflection plate 820 is installed under the light guiding plate 910 for reflecting the light transmitted through a bottom surface opposite to the emitting surface 930 into the light guiding plate 910. The diffusion sheets in the light diffusion member 810 and the reflection plate 820 can improve the light efficiency.

The light is generated from the luminous bodies 920, and then is provided into the light guiding plate 910 through the incident surface 911, the first chamfer surface 912 and the second chamfer surface. Subsequently, the incident light is reflected or refracted inside the light guiding plate 910 and emitted to the display unit 700 through the emitting surface 930. The luminous bodies 920 are disposed corresponding to the first and second chamfer surfaces at the edge portions of the light guiding plate 910, so that the luminance uniformity of the display unit 700 can be improved compared to the conventional display apparatus in which all of the luminous bodies are disposed parallel to the incident surface 911. Especially, when the number of the luminous bodies is decreased so as to reduce the power consumption, the dark portion of the light guiding plate 910, non-emissive region between more spaced luminous bodies, does not appear since the light emitted from the luminous bodies disposed corresponding to the first and second chamfer surfaces can be fully provided to the entire surface of the incident surface 911, thereby preventing the luminance uniformity from being dropped off.

When LEDs are used as the luminous bodies, a decrease in the number of the luminous bodies is essential to save manufacturing cost and improve power efficiency of the display apparatus, because LEDs are very expensive and consume much more power than any other elements of the display apparatus.

As described above, in the present invention, at least one chamfer surface is formed by removing at least one corner portion of the light guiding plate, and at least one luminous body is disposed corresponding to the at least one chamfer surface, so that the emitting region of the at least one luminous body is enlarged. Therefore, when the number of luminous bodies is decreased, the dark portion of the light guiding plate, a non-emissive portion of the light guiding plate between more spaced luminous bodies due to a decrease of the number of luminous bodies, does not appear, thereby improving the luminance uniformity of the display apparatus.

Therefore, the number of luminous bodies can be decreased without dropping off luminance uniformity of an illuminating device, so that manufacturing cost of the illuminating device can be reduced and the power efficiency can be improved. Especially, when the illuminating device is used as the backlight assembly of the display apparatus, such modification of the shape of a light guiding plate and arrangement of the luminous bodies can reduce the manufacturing cost and consuming power.

Although the exemplary embodiments of the present invention have been described, it is understood that the present invention should not be limited to these embodiments but various changes and modifications can be made by one skilled in the art within the spirit and scope of the present invention as hereinafter claimed.

What is claimed is:

1. An illuminating device for illuminating a display apparatus, comprising:
    a light guiding part that guides light to a display unit of the display apparatus, the light guiding part including:
        an incident surface on which the light is incident;
        a back surface opposite to the incident surface;
        an emitting surface from which the light incident on the incident surface is emitted to the display unit;
        side surfaces disposed between the incident surface and the back surface; and
        a first chamfer surface formed at a corner portion between the incident surface and one of the side surfaces, the first chamfer surface forming an angle that is no more than 90-EA/2 degree with respect to an imaginary surface extended from the light incident surface; and
    a first light source part that emits the light to the light guiding part, the first light source part including a first marginal luminous body disposed to correspond to the first chamfer surface, wherein an amount of the light detected in front of the first marginal luminance body is double of an amount of the light detected at the EA/2 degree deviated position, and wherein the EA indicates an emitting angle of the first luminous body.

2. The illuminating device as claimed in claim 1, wherein the light guiding part further comprises a second chamfer surface symmetric to the first chamfer surface with respect to a longitudinal central line of the light guiding part, and the first light source part further comprises a second marginal luminous body disposed to correspond to the second chamfer surface.

3. The illuminating device as claimed in claim 2, wherein the first light source part further comprises a first central luminous body disposed to correspond to the incident surface.

4. The illuminating device as claimed in claim 3, wherein the first light source part further comprises at least one additional central luminous body disposed to correspond to the incident surface, the at least one additional central luminous body and the first central luminous body being arranged in a same line parallel to the incident surface and spaced each other at a predetermined distance.

5. The illuminating device as claimed in claim 2, further comprising a second light source part, and the light guiding part further comprising a third chamfer surface and a fourth chamfer surface, wherein the third chamfer surface is symmetric with the second chamfer surface with respect to a widthwise central line of the light guiding part, and the second light source part includes a third marginal luminous body disposed to correspond to the third chamfer surface, a fourth marginal luminous body disposed to correspond to the fourth chamfer surface, and a second central luminous body disposed to correspond to a back incident surface disposed between the third and fourth chamfer surfaces.

6. The illuminating device as claimed in claim 5, wherein the second light source part further comprises at least one additional central luminous body disposed to correspond to the back incident surface, the at least one additional central luminous body and the second central luminous body being arranged in a same line parallel to the back incident surface and spaced each other at predetermined distance.

7. The illuminating device as claimed in claim 4, wherein each of the luminous bodies comprises a light emitting diode.

8. The illuminating device as claimed in claim 1, wherein the light guiding part has a wedge shape such that the thickness of the light guiding part is linearly decreased from the incident surface to the back surface.

9. The illuminating device as claimed in claim 1, further comprising a light scattering member formed on a bottom portion of the light guiding part, for scattering the light provided from the incident surface to the emitting surface.

10. The illuminating device as claimed in claim 1, wherein the 90-EA/2 degree is about 30 degrees.

11. A display apparatus for displaying an image, comprising:
   a backlight assembly that generates light, the backlight assembly including:
   a light guiding part that guides the light, the light guiding part having:
      an incident surface on which the light is incident;
      a back surface opposite to the incident surface;
      an emitting surface from which the light incident on the incident surface is emitted;
      side surfaces disposed between the incident surface and the back surface; and
      a first chamfer surface formed at a corner portion between the incident surface and one of the side surfaces, the first chamfer surface forming an angle that is no more than 90-EA/2 degree with respect to an imaginary surface extended from the light incident surface; and
   a first light source part for emitting the light to the light guiding part, the first light source part having:
      a first marginal luminous body disposed to correspond to the first chamfer surface; and
      a first central luminous body disposed to correspond to the incident surface; and
   a display unit disposed on the emitting surface for displaying images using the light supplied from the backlight assembly, wherein an amount of the light detected in front of the first marginal luminance body is double of an amount of the light detected at the EA/2 degree deviated position, wherein the EA indicates an emitting angle of the first luminous body.

12. The display apparatus as claimed in claim 11, wherein the light guiding part further comprises a second chamfer surface symmetric with the first chamfer surface with respect to a longitudinal central line of the light guiding part, and the first light source part further comprises a second marginal luminous body disposed to correspond to the second chamfer surface.

13. The display apparatus as claimed in claim 12, wherein the display apparatus further comprises a second light source part, and the light guiding part further comprising a third chamfer surface and a fourth chamfer surface, wherein the third chamfer surface symmetric with first chamfer surface and the fourth chamfer surface is symmetric with the second chamfer surface with respect to a widthwise central line of the light guiding part, and the second light source part includes a third marginal luminous body disposed to correspond to the third chamfer surface, a fourth marginal luminous body disposed to correspond to the fourth chamfer surface, and a second central luminous body disposed to correspond to a back incident surface disposed between the third and fourth chamfer surfaces.

14. The display apparatus as claimed in claim 13, wherein each of the luminous bodies comprises a light emitting diode.

15. The display apparatus as claimed in claim 11, wherein the light guiding part has a wedge shape such that the thickness of the light guiding part is linearly decreased from the incident surface to the back surface.

16. The display apparatus as claimed in claim 11, further comprising a light scattering member formed on a bottom portion of the light guiding part, for scattering the light provided from the incident surface to the emitting surface.

17. The display apparatus as claimed in claim 11, further comprising a light diffusion member disposed between the emitting surface and the display unit, for increasing light uniformity of the display unit.

18. The display apparatus as claimed in claim 11, further comprising a light reflection member disposed below the light guiding part, for reflecting the light.

19. The display apparatus as claimed in claim 11, wherein the display unit includes a color filter substrate having pixels for presenting colors, a thin film transistor substrate disposed below the color filter substrate and having a thin film transistor for electrically controlling each of the pixels, and liquid crystal interposed between the color filter substrate and the thin film transistor substrate for controlling light transmittance according to electric field intensity.

20. The display apparatus as claimed in claim 11, wherein the 90-EA/2 degree is about 30 degrees.

21. An illuminating device for illuminating a display apparatus,
   a light guiding part that guides light to a display unit of the display apparatus, the light guiding part including:
      an incident surface on which the light is incident;
      a back surface opposite to the incident surface;
      an emitting surface from which the light incident on the incident surface is emitted to the display unit;
      side surfaces perpendicular to the incident surface and the emitting surface;
      a first chamfer surface formed at a corner portion between the incident surface and one of the side surfaces, wherein the first chamfer surface meets the incident surface at a chamfer angel;
      a second chamfer surface symmetric to the first chamfer surfaces with respect to a longitudinal central line of the light guiding part; and
      a third chamfer surface and a fourth chamfer surface, wherein the third chamfer surface is symmetric with the first chamfer surface and the fourth chamfer surface is symmetric with the second chamfer surface with respect to a widthwise central line of the light guiding part;
   a first light source part that emits the light to the light guiding part, the first light source part including a first marginal luminous body disposed to correspond to the first chamfer surface, and a second marginal luminous body disposed to correspond to the second chamfer surface; and
   a second light source part including a third marginal luminous body disposed to correspond to the third chamfer surface, a fourth marginal luminous body disposed to correspond to the fourth chamfer surface, and a second central luminous body disposed to correspond to a back incident surface disposed between the third and fourth chamfer surfaces.

22. The illuminating device as claimed in claim 21, wherein the second light source part further comprised at least one additional central luminous body disposed to correspond to the back incident surface, the at least one additional central luminous body and the second central luminous body being arranged in a same line parallel to the back incident surface and spaced each other at a predetermined distance.

23. A display apparatus for displaying an image, comprising:
- a backlight assembly for generating light, the backlight assembly including:
  - a light guiding part that guides the light, the light guiding part having:
    - a back surface opposite to the incident surface;
    - an emitting surface from which the light incident on the incident surface is emitted;
    - side surfaces perpendicular to the incident surface and the emitting surface; and
    - a first chamfer surface formed at a corner portion between the incident surface and one of the side surfaces, wherein the first chamfer surface meets the incident surface at a chamfer angel;
    - a second chamfer surface symmetric with the first chamfer surface with respect to a longitudinal central line of the light guiding part; and
    - a third chamfer surface and a fourth chamfer surface, wherein the third chamfer surface symmetric with the first chamfer surface and the fourth chamfer surface is symmetric with the second chamfer surface with respect to a widthwise central line of the light guiding part;
  - a first light source part for emitting the light to the light guiding part, the first light source part having:
    - a first marginal luminous body disposed to correspond to the first chamfer surface; and
    - a first central luminous body disposed to correspond to the incident surface; and
    - a second marginal surface body disposed to correspond to the second chamfer surface;
  - a second light source part including a third marginal luminous body disposed to correspond to the third chamfer surface, a fourth marginal luminous body disposed to correspond to the fourth chamfer surface, and a second central luminous body disposed to correspond to a back incident surface disposed between the third and fourth chamfer surfaces; and
- a display unit disposed on the emitting surface for displaying images using the light supplied from the backlight assembly.

24. The display apparatus as claimed in claim 13, wherein each of the luminous bodies comprises a light emitting diode.

* * * * *